United States Patent [19]

Villalon et al.

[11] Patent Number: 4,925,205

[45] Date of Patent: May 15, 1990

[54] TAMPER RESISTANT TRAILER HITCH

[75] Inventors: S. Leonard Villalon; James D. Olds; William H. Shoffner, all of Duncan, Okla.

[73] Assignee: Guardian Hitch, Inc., Duncan, Okla.

[21] Appl. No.: 116,459

[22] Filed: Nov. 3, 1987

[51] Int. Cl.⁵ .............................................. B60D 1/06
[52] U.S. Cl. .................................... 280/507; 280/512; 403/143
[58] Field of Search ............... 280/400, 507, 511, 512, 280/402, 403; 70/58; 403/141, 143, 322, 325, 327, 328

[56] References Cited

U.S. PATENT DOCUMENTS

| Re. 28,187 | 10/1974 | Longenecker | 280/507 |
|---|---|---|---|
| 1,240,995 | 9/1917 | Menhall et al. | |
| 1,927,591 | 9/1933 | Jacob | 280/33.15 |
| 2,035,486 | 3/1936 | Larson | 280/33.15 |
| 2,078,851 | 4/1937 | Hovey | 280/33.15 |
| 2,157,681 | 5/1939 | Storey | 280/33.15 |
| 2,204,882 | 6/1940 | Berluti | 280/33.17 |
| 2,237,031 | 4/1941 | Gilmore | 280/33.17 |
| 2,475,780 | 7/1949 | Fearnehough | 280/33.17 |
| 2,542,643 | 2/1951 | Duncan | 280/33.17 |
| 3,088,752 | 5/1963 | Dressen | 280/508 |
| 3,139,291 | 6/1964 | Geresy | 280/507 |
| 3,237,969 | 3/1966 | Geresy | 280/507 |
| 3,374,268 | 3/1968 | Groves | 280/512 |
| 3,433,503 | 3/1969 | Davis | 280/512 |
| 3,650,546 | 3/1972 | Koenig | 280/423 |
| 3,780,546 | 12/1973 | Longenecker | 70/58 |
| 3,820,823 | 6/1974 | Beaston | 280/512 |
| 3,826,517 | 7/1974 | Hunter | 280/511 |
| 3,831,982 | 8/1974 | Bernhardt et al. | 280/511 |
| 3,884,055 | 5/1975 | Vuillemot | 78/58 |
| 4,157,190 | 6/1979 | Nyman | 280/512 |
| 4,291,557 | 9/1981 | Bulle et al. | 70/58 |
| 4,778,196 | 10/1988 | Spoliansky | 280/512 |

FOREIGN PATENT DOCUMENTS 745049  11/1943  Fed. Rep. of Germany .

OTHER PUBLICATIONS

"Hammer Blow Drop Forged Bulldog ® Trailer Couplers", published by the Hammer Blow Corporation in Wausau, Wisconsin-Brochure.

*Primary Examiner*—Charles A. Marmor
*Assistant Examiner*—Richard Camby
*Attorney, Agent, or Firm*—Laney, Dougherty, Hessin & Beavers

[57] ABSTRACT

A tamper resistant trailer hitch. The trailer hitch includes a body with a hitch ball receiving cavity therein and a conventional coupling mechanism. The hitch may be locked in a coupled position on the hitch ball or in an uncoupled position in which the ball receiving cavity is covered to provide tamper resistance. In a first embodiment, a side opening coupling configuration is used with the cover mounted on a rotating locking ring. In a second embodiment, a pivoting locking plate is mounted on the lower side of the hitch. In a third embodiment, a sliding locking plate is mounted on the lower side of the hitch.

15 Claims, 6 Drawing Sheets

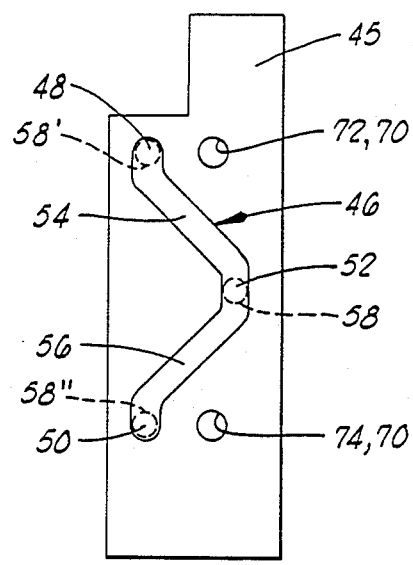
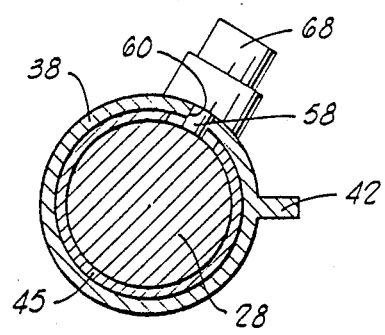
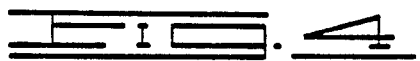
FIG. 4
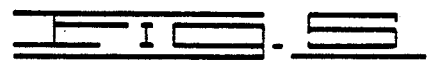
FIG. 5
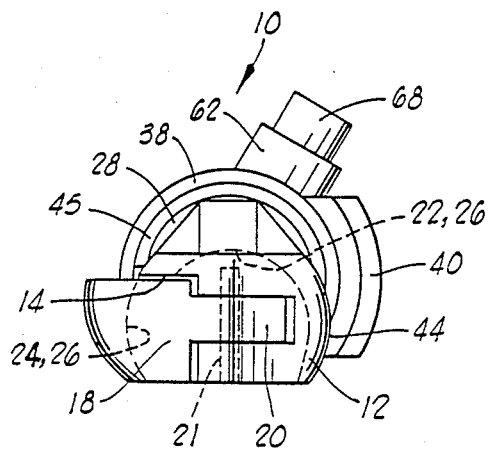
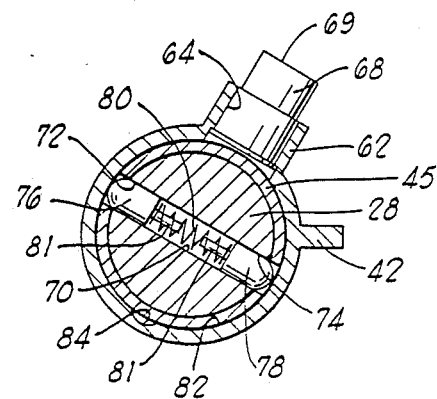
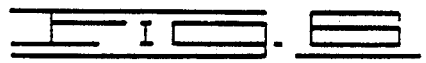
FIG. 6
FIG. 7

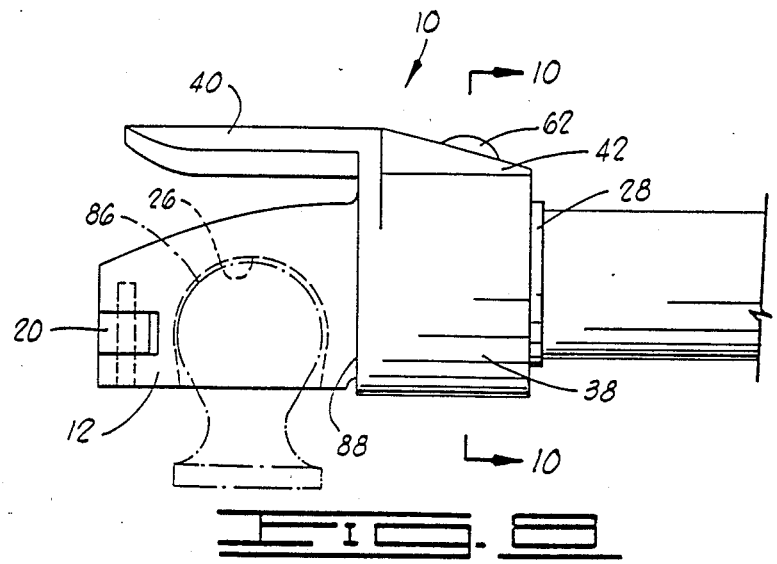
FIG. 8
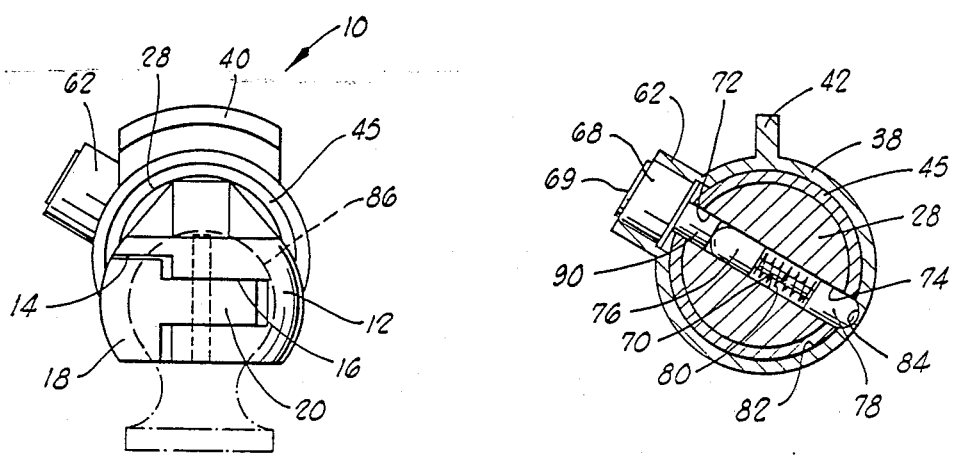
FIG. 9
FIG. 10

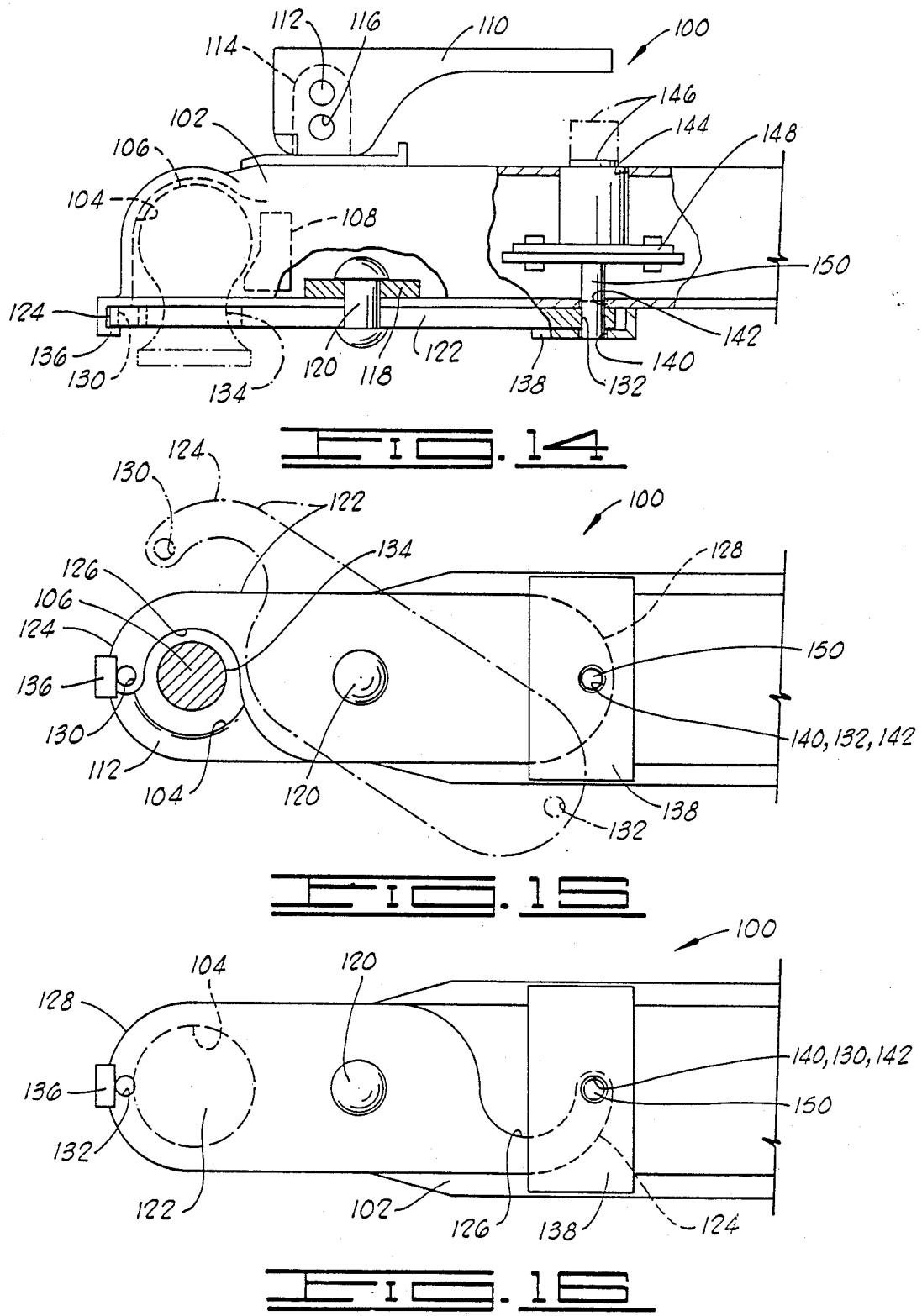

TAMPER RESISTANT TRAILER HITCH

BACKGROUND OF THE INVENTION

1. Field Of The Invention

This invention relates to ball-type trailer hitches, and more particularly, to a trailer hitch having a first locked position coupled to a trailer ball attached to a vehicle and a second locked position uncoupled from the ball in which a ball receiving opening of the hitch is covered to resist tampering.

2. Description Of The Prior Art

Ball-type trailer hitches adapted for coupling to a hitch ball affixed to a vehicle are well known in the art. Various configurations are available, but basically each includes a housing having a downwardly opening ball receiving cavity therein and having a means for latching or coupling to the ball so that the hitch will remain in place while the trailer is being towed. Many of such prior art trailer hitches include means for attaching a padlock for locking the hitch in the coupled position. Some hitches include a built-in cylinder type lock.

However, a problem with previously known trailer hitches is that the ball receiving cavity remains open when the hitch is uncoupled from the ball. The hitches may be locked in the coupled position, but because the majority of the opening is still free, it is a simple matter for a thief to insert a smaller ball or other device into the hitch and steal the trailer. Unfortunately, this occurs all too frequently.

The trailer hitch of the present invention solves this problem by providing another locked position when the hitch is uncoupled from the ball. In this other locked position, the ball receiving cavity is covered so that nothing may be inserted therein. A locking means is provided for locking the hitch in this covered position. Thus, a tamper resistant hitch is provided even when disconnected from the ball on the vehicle.

SUMMARY OF THE INVENTION

The tamper resistant trailer hitch of the present invention is adapted for connection to a conventional hitch ball and comprises a housing or body at least partially defining an open sided ball receiving cavity therein, coupling means on the housing for coupling engagement with the hitch ball when the hitch ball is positioned in the cavity, and closure means for preventing undesired removal of the hitch ball from the cavity and for covering the open side of the cavity when the hitch ball is removed from the cavity. The hitch preferably further comprises locking means for selectively locking the closure means with respect to the housing when the hitch ball is positioned in the cavity and with respect to the housing when the cavity is covered. In preferred embodiments, the locking means is characterized by a cylinder lock having a reciprocating lock member or pin thereon for lockingly engaging the housing and the closure means. However, other lock configurations could be used.

In a first embodiment, the coupling means is characterized by a gate member pivotally mounted on the housing and forming a portion of the ball receiving cavity. The gate member has an uncoupled, open position pivoted away from the housing wherein the hitch ball may be inserted into and removed from the cavity, and a coupled, closed position pivoted toward the housing for couplingly engaging the hitch ball in the cavity and preventing removal of the hitch ball from the cavity. Biasing means are preferably provided for biasing the gate member toward the uncoupled position.

In the first embodiment, the enclosure means preferably comprises a ring rotatably mounted with respect to a neck portion extending from the housing and a cover extending from the ring. The ring is rotatable between a first position spaced from the gate member, a second position engaging the gate member and retaining the gate member in the coupled position thereof, and a third position in which the cover is disposed across the open side of the cavity. This embodiment further comprises a cam portion on one of the neck and the ring, and a cam follower on the other of the neck and ring and engaging a cam groove in the cam portion, such that the ring is moved longitudinally away from the housing when rotated to the first position of the ring, and the ring is moved longitudinally toward the housing when rotated to the second and third positions of the ring. The cam portion may be a separate piece or integrally formed with the neck portion or ring. The cam groove is substantially V-shaped. The first and second positions of the ring are angularly disposed approximately 90° from one another, and the first and third positions of the ring are also angularly disposed at approximately 90° from one another.

In the first embodiment, the neck defines a transverse hole therethrough having first and second ends, and the lock member is lockingly engageable with the first end of the hole when the ring is in the second position and is lockingly engageable with the second end of the hole when the ring is in the third position. Detent means are preferably disposed in the hole for aligning the lock member with the hole. The detent means preferably comprises a detent recess defined in an inner surface of the ring and opposite the lock member, a pair of detent pins slidably disposed in the hole, each of the detent pins being engageable with the detent recess when aligned therewith, and biasing means for radially outwardly biasing the detent pins toward the inner surface of the ring.

In a second embodiment of the trailer hitch, the closure means comprises a locking plate pivotally mounted to the housing and comprising a first end having a curvilinear notch therein positionable adjacent a neck of the hitch ball when the locking plate is in a coupled position and a substantially solid second end positionable across the open side of the cavity when the locking plate is in an uncoupled position. The locking plate is pivoted through an angle of approximately 180° from the coupled position to the uncoupled position. The locking plate has a variable free position between the coupled and uncoupled positions wherein the hitch ball may be inserted into and removed from the cavity.

In the second embodiment, the locking plate preferably defines first and second holes through the first and second ends thereof, respectively, and the lock member is lockingly engageable with the second hole in the locking plate when the locking plate is in the coupled position and is lockingly engageable with the first hole in the locking plate when the locking plate is in the uncoupled position. Preferably, the second embodiment of the trailer hitch further comprises a bottom guard plate disposed on an opposite side of the locking plate from the housing, the guard plate defining a hole therethrough, wherein the lock member is further engageable with the hole in the guard plate when engaged with either one of the first and second holes in the locking plate. A forward guard may also be provided adjacent a forward end of the housing and having a portion extending on an opposite side of the locking plate from the housing.

In a third embodiment of the trailer hitch, the closure means comprises a locking plate slidably disposed adjacent the housing, the locking plate having a free position spaced rearwardly from the cavity such that the hitch ball may be inserted into and removed from the cavity, a coupled position wherein an edge of the locking plate is positioned adjacent a neck of the hitch ball, and an uncoupled position covering the open side of the cavity. In the preferred third embodiment, the locking plate defines a pair of holes therethrough, and the lock member is lockingly engageable with one of the holes in the locking plate when the locking plate is in the coupled position and is lockingly engageable with the other of the holes in the locking plate when the locking plate is in the uncoupled position.

The third embodiment also preferably comprises a bottom plate attached to the housing such that a channel is defined therebetween, and the locking plate is slidably positioned in the channel. The bottom plate defines a hole therethrough, and the holes in the locking plate are selectively alignable with the hole in the bottom plate such that the lock member is engaged with the hole in the bottom plate when engaged with either of the holes in the locking plate.

Also in the third embodiment, the bottom plate preferably defines a longitudinally disposed slot therethrough, and an actuation pin or handle is attached to the locking plate and extends through the slot in the bottom plate.

An important object of the present invention is to provide a tamper resistant trailer hitch whether the hitch is coupled or uncoupled.

Another important object of the present invention is to provide a trailer hitch which may be locked in a position coupled to a hitch ball and also locked in an uncoupled position in which a ball receiving cavity is covered.

Additional objects and advantages of the invention will become apparent as the following detailed description of the preferred embodiments is read in conjunction with the drawings which illustrate such preferred embodiments.

BRIEF DESCRIPTION OF THE DRAWINGS

FIG. 4 is a diagram of the cam groove profile shown in relationship to opposite ends of a locking hole.

FIG. 5 is a vertical cross section taken along lines 5—5 in FIG. 1.

FIG. 6 is a front end view of the first embodiment shown in the unlocked, uncoupled position.

FIG. 7 is a vertical cross section taken along lines 7—7 in FIG. 1.

FIG. 8 shows a side elevation view of the first embodiment of the trailer hitch shown in a locked, coupled position.

FIG. 9 is a front end view of the first embodiment in the locked, coupled position.

FIG. 10 is a cross section taken along lines 10—10 in FIG. 8.

FIG. 14 presents a side view of a second embodiment of the trailer hitch of the present invention shown in a locked, coupled position, including fragmentary cross-sectional portions showing certain details.

FIG. 15 is a bottom view of the second embodiment trailer hitch shown in the locked, coupled position and indicating an unlocked, free and uncoupled position in phantom lines.

FIG. 16 is a bottom view of the second embodiment shown in a locked, uncoupled position in which the ball receiving cavity is covered.

DESCRIPTION OF THE PREFERRED EMBODIMENTS

FIRST EMBODIMENT

Figure 1:
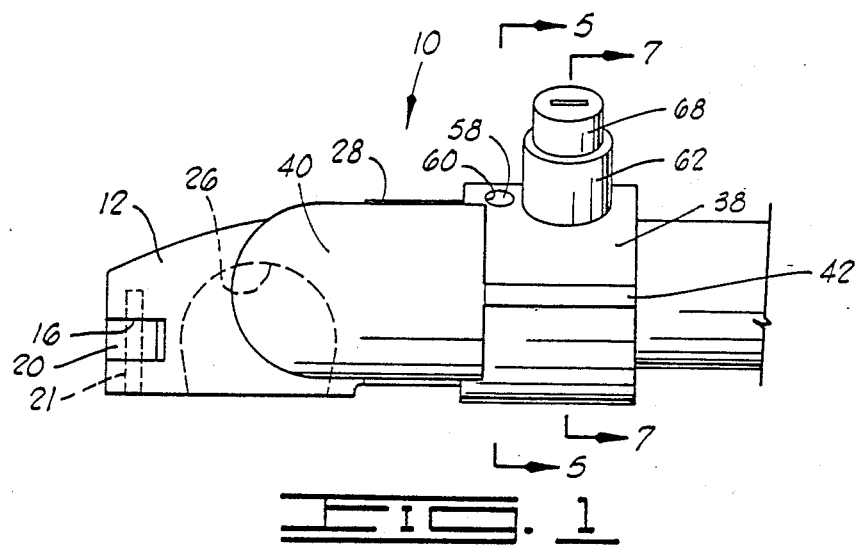
FIG. 1 presents a side elevation view of a first embodiment of the tamper resistant trailer hitch of the present invention shown in an unlocked, free and uncoupled position.

Referring now to the drawings, and more particularly to FIGS. 1-13, a first embodiment of the tamper resistant trailer hitch of the present invention is shown and generally designated by the numeral 10. The first embodiment has a configuration generally described as a side-opening type.

Figure 2:
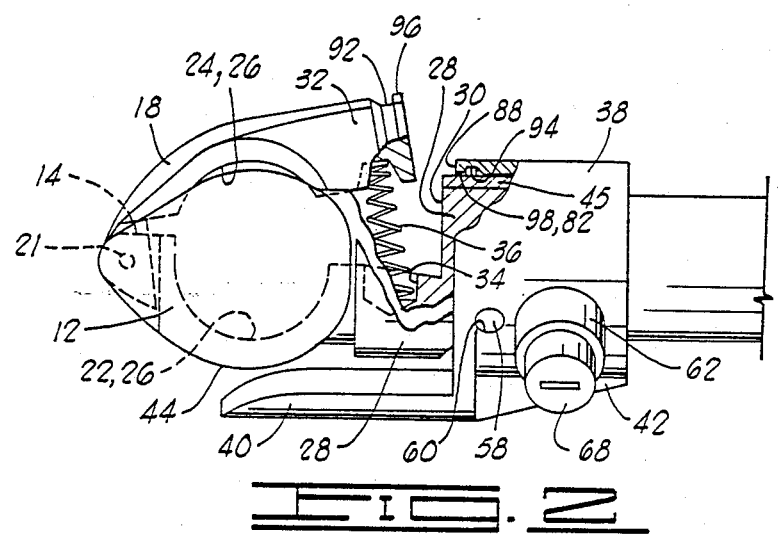
FIG. 2 is a top view of the trailer hitch of the first embodiment in the unlocked, uncoupled position, including a fragmentary cross section showing some internal details.

Referring now to FIGS. 1, 2 and 6, first embodiment hitch 10 includes a housing or body 12 with a large notch 14 in a side thereof with a smaller notch portion 16 extending horizontally therefrom. A gate member 18 is movably positioned in notch 14. Gate member 18 has a hinge portion 20 thereon which extends into smaller notch portion 16. Gate member 18 is pivotally attached to body 12 by a pivot pin 21 which extends upwardly from a bottom surface of the body.

Body 12 and gate member 18 define first and second portions 22 and 24, respectively, of a ball receiving cavity 26. Cavity 26 is a ball receiving cavity of a kind known in the art, and when gate member 18 is moved to a closed position toward body 12, a trailer hitch ball is couplingly engaged in cavity 26, as will be discussed further herein.

Extending rearwardly from body 12 is a substantially cylindrical neck portion 28 which is preferably integrally formed with body 12. A rear portion 30 of notch 14 extends into neck portion 28. An end or rear portion 32 of gate member 18 extends into rear portion 30 of notch 14, as best shown in FIG. 2. Adjacent rear portion 30 of notch 14, neck portion 28 defines a substantially transverse hole 34 therein. A biasing means, such as a spring 36, is disposed in hole 34 and engages end portion 32 of gate member 18 for biasing gate member 18 toward its outermost position with respect to body 12, as shown in FIG. 2. This corresponds to a free and uncoupled position of first embodiment hitch 10. It will be seen that in this position, first and second portions 22 and 24 of cavity 26 are spaced apart which allows positioning of a hitch ball therein or removal of the ball therefrom.

A locking ring 38, preferably of cylindrical configuration, is rotatably and slidably positioned on neck portion 28. Extending from a forward end of locking ring 38 in a direction toward body 12 is a cover 40. A longitudinally extending web 42 provides reinforcement for cover 40. In the unlocked position shown in FIGS. 1, 2 and 6, cover 40 is generally positioned adjacent a side 44 of body 12 opposite gate member 18.

Figure 3:
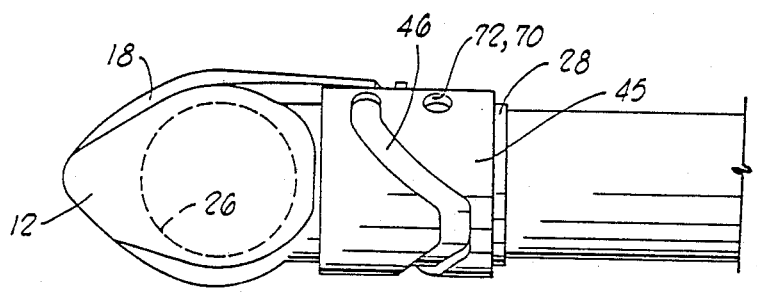
FIG. 3 is a top view of the first embodiment of the trailer hitch with a locking ring removed to show a cam groove.

Referring now to FIGS. 3, 4 and 5, a cam portion 45 is disposed around neck portion 28 and defines a substantially V-shaped cam groove 46 therein. As illustrated, cam portion 45 comprises a separate ring attached to neck portion 28 by welding or the like. However, cam portion 45 may also be integrally formed with neck portion 28. Thus, cam groove 46 may also be described as being defined in neck portion 28. The invention is not intended to be limited to a separate cam portion.

Cam groove 46 has first and second end portions 48 and 50 and a narrow central portion 52 spaced rearwardly from first and second end portions. A first leg portion 54 interconnects first end portion 48 and center portion 52, and a second leg portion 56 interconnects second end portion 50 and central portion 52. A cam pin or follower 58 is pressed into a radially oriented hole 60 in locking ring 38 and extends into cam groove 46. It will be seen by those skilled in the art that a reverse construction would work equally well. That is, a cam groove could be located on the inner surface of locking ring 38, or on a separate cam portion attached to locking ring 38, with a cam pin or follower extending radially outwardly from neck portion 28. The invention is not intended to be limited to the particular cam and pin arrangement illustrated in the drawings.

In the unlocked, uncoupled position of first embodiment hitch 10, cam pin 58 is located in central portion 52 of cam groove 46. It will be seen that this locates locking ring 38 in a first position with respect to body 12 and neck portion 28. In this first position, locking ring 38 is spaced rearwardly from body 12 and end portion 32 of gate member 18 so that the gate member may be pivoted as desired with respect to body 12. As will be discussed in more detail herein, rotation of locking ring 38 in either direction will force the locking ring forward and over end portion 32 of gate member 18 to lock the gate member in a closed position.

Referring to FIGS. 1 and 2, a substantially cylindrical lock support collar 62 extends radially outwardly from locking ring 38 at a location adjacent and rearward of cam pin 58. Preferably, a central axis of cam pin 58 and a central axis of lock support collar 62 are coplanar. As best seen in FIG. 7, central opening 64 of lock support collar 62 also extends through the wall of locking ring 38. A locking means, such as a cylinder lock 68 of a kind known in the art, is disposed in central opening 64 of lock support collar 62 and has an outwardly facing button 69. While a cylinder lock 68 has been illustrated, other lock configurations could also be used, and the invention is not intended to be limited to any particular type.

Still referring to FIG. 7, neck portion 28 and cam portion 45 define a transverse, centrally located hole 70 therethrough having first and second ends 72 and 74, respectively. The central axis of lock support collar 62 intersects a central axis of hole 70.

First and second detent pins 76 and 78, respectively, are slidably positioned in hole 70. A biasing means, such as spring 80, is positioned between detent pins 76 and 78 for biasing the detent pins outwardly toward inner wall 82 of locking ring 38. The radially inner ends of detent pins 76 and 78 have a small shaft 81 extending inwardly therefrom, and spring 80 is disposed around shafts 81. As an alternate construction (not shown), detent pins 76 and 78 could have longitudinal holes therein extending from the radially inner side thereof with the spring disposed in the holes. In other words, the springs could be supported on the outside by the walls of the hole rather than on the inside by shafts 81 in the embodiment shown in the drawings. The invention is not intended to be limited to the particular detent pin and spring configuration illustrated.

A detent recess 84 is defined in inner surface 82 of locking ring 38 opposite central opening 64 of lock support collar 62. First and second detent pins 76 and 78, spring 80 and recess 84 provide a detent means for locating locking ring 38 with respect to neck portion 28 and cam portion 45 for aligning cylinder lock 68 with hole 70 in neck portion 28 and cam portion 45, as will be further described herein.

Referring again to FIG. 4, the schematic illustrates the orientation of first and second ends 72 and 74 of hole 70 with respect to cam groove 46. It will be seen that first end portion 48 of cam groove 46 is substantially aligned longitudinally with first end 72 of hole 70, and second end portion 50 of cam groove 46 is substantially aligned longitudinally with second end 74 of hole 70. In other words, first and second end portions 48 and 50 of cam groove 46 are angularly displaced at an angle of approximately 180°, each end portion being approximately 90° from central portion 52 of cam groove 46.

Referring now to FIGS. 8-10, first embodiment hitch 10 is shown in a locked, coupled position in which it is engaged with hitch ball 86 of a kind known in the art. In this position, ball 86 has been inserted into cavity 26 and gate member 18 has been pivoted toward body 12 to couple against the ball in a manner known in the art. In this position, ball 86 cannot be removed from cavity 26.

To lock hitch 10 in this coupled position, gate member 18 is held in its closed position to overcome the force exerted by spring 36, and locking ring 38 is rotated to a second position in a counterclockwise direction when viewed in FIG. 9. The total rotation necessary is approximately 90°. Referring also to FIG. 4, it will be seen that rotation of locking ring 38 around neck 28 will cause cam pin 58 to move into first leg portion 54 of cam groove 46. As rotation occurs, locking ring 38 is thus moved longitudinally toward body 12 until cam pin 58 is located in first end portion 48 of cam groove 46, as indicated by reference numeral 58'. At this point, forward end 88 of locking ring 38 is immediately adjacent body 12, as best shown in FIG. 8. It will be seen that gate member 18 must be pivoted toward body 12, compressing spring 36 prior to rotation of locking ring 38. Locking ring 38 will be moved over rear portion 32 of gate member 18, so that the gate member will be held in its closed position. Also at this point, it will be seen that cover 40 is positioned above body 12. This is also illustrated in FIG. 9. Referring now to FIG. 10, once locking ring 38 has been rotated and moved forward longitudinally to its locking position, cylinder lock 68 will be aligned with hole 70 and positioned adjacent first end 72 thereof. As locking ring 38 is rotated to this position, second detent pin 78 will snap into detent recess in the locking ring. Thus, the operator will know when the apparatus is in the proper position for locking. Locking button may then be depressed such that a lock pin or member 90 will extend radially inwardly from lock 68 into first end 72 of hole 70, moving detent pin 76 radially inwardly and compressing spring 80, thus locking lock ring 38 against rotation with respect to neck 28. It will be seen that when this occurs, hitch 10 is in a locked, coupled position on hitch ball 86 and cannot be removed without unlocking cylinder lock 68. Preferably, but not by way of limitation, shaft 81 of first detent pin 76 is in contact with shaft 81 of second detent pin 78 when lock pin 90 is positioned in hole 70. In other words, lock pin 90 and detent pins 76 and 78 form a substantially solid column in hole 70 for rigid locking. As already indicated, it is not intended that the invention be limited to the specific lock 68, and thus a lock with a lock pin 90 is not required. All that is necessary is that the locking means provide a locking engagement between locking ring 38 and neck portion 28.

To unlock and uncouple hitch 10 from ball 86, the procedure is reversed. However, the apparatus includes safety catch means to prevent gate 18 from moving to its fully uncoupled position without specific action taken by the operator. Referring again to FIG. 2, end portion 32 of gate 18 has an outwardly opening groove 92 therein, and inner surface 82 of locking ring 38 has an inwardly opening groove 94 therein adjacent forward end 88 of the locking ring. Thus, a lip 96 is formed adjacent groove 92, and another lip 98 is formed adjacent groove 94. As locking ring 38 is longitudinally moved rearwardly during the uncoupling process, spring 36 maintains an outwardly directed force against end portion 32 of gate 18. As groove 94 moves rearwardly past groove 92, lip 96 will engage groove 94, and lip 98 will engage groove 92. It will thus be seen that locking ring 38 cannot be moved further rearwardly as long as this engagement of grooves and lips occurs. To disengage, the operator presses inwardly on gate 18, so that locking ring 38 may be rotated back to the unlocked position. The operator can then release gate 18, allowing spring 36 to move it to the unlocked position. In this way, the operator is in complete control, and gate 18 cannot snap outwardly to its open position without warning.

Figure 11:
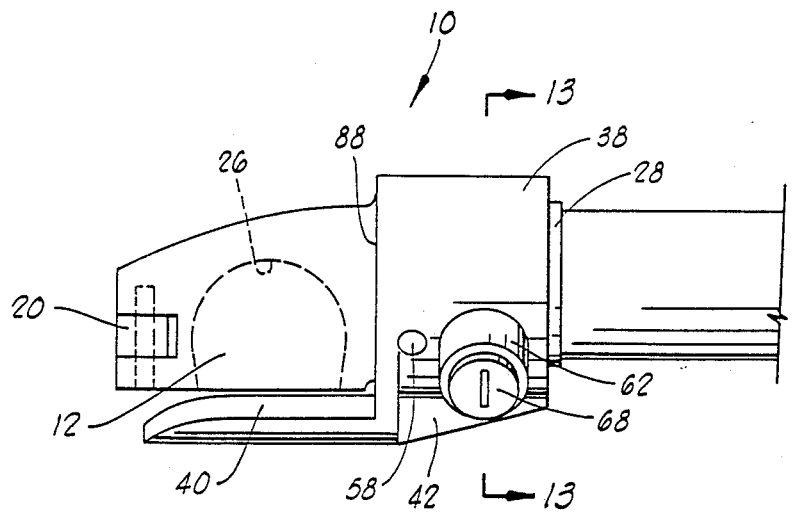
FIG. 11 illustrates a side elevation of the first embodiment of the trailer hitch shown in a locked, uncoupled position in which the ball receiving cavity is covered.
Figure 12:
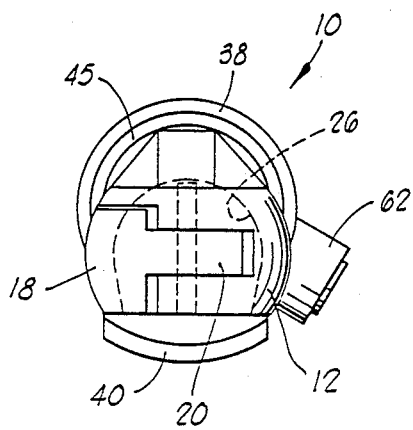
FIG. 12 shows a front end view of the first embodiment in the locked, uncoupled position.
Figure 13:
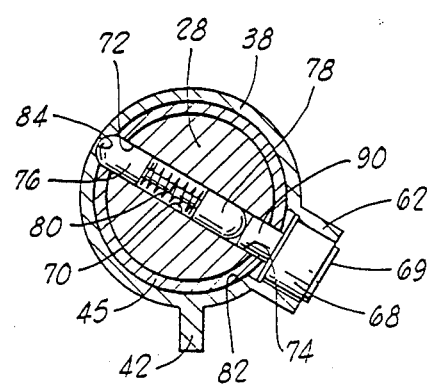
FIG. 13 is a vertical cross section taken along lines 13—13 in FIG. 11.

Referring now to FIGS. 11-13, first embodiment trailer hitch 10 is shown in a locked, uncoupled position. To place the apparatus in this position, locking ring 38 is rotated clockwise from the position shown in FIG. 6 to a third position shown in FIG. 12. Cover 40 is thus moved to a position below cavity 26 extending across and completely covering the open, lower end thereof to prevent access thereto. In this way, a thief may not insert a smaller hitch ball or other device into the cavity 26 to steal the trailer.

Referring again also to FIG. 4, rotation of locking ring 38 to the locked, uncoupled position of hitch 10 will move cam pin 58 into second leg portion 56 of cam groove 46. Thus, if gate member 18 is depressed to its closed position, as locking ring 38 is rotated toward its third position, locking ring 38 will be moved longitudinally forward such that forward end 88 thereof is immediately adjacent body 12. Maximum rotation occurs when cam pin 58 reaches second end portion 50 of cam groove 46, as indicated by reference numeral 58". It will be seen that in this position, locking ring 38 again acts to retain gate 18 in the closed position, just as when coupled to a hitch ball.

Referring now to FIG. 13, first detent pin 76 will snap into detent recess 84 as locking ring 38 is moved to the third position, thus again alerting the operator that it is in the proper position for locking. Actuation of lock 68 allows lock pin or member 90 to extend radially inwardly into hole 70 adjacent second end 74 thereof. When this occurs, second detent pin 78 is moved radially inwardly to a position adjacent first detent pin 76, thus compressing spring 80. Again, lock pin 90 and detent pins 76 and 78 form a substantially solid column in hole 70. As with the other locked position, it will be seen that locking ring 38 is thus locked against rotation with respect to neck 28, so that hitch 10 is maintained in the position with cover 40 protecting cavity 26. Thus, first embodiment 10 provides a tamper resistant trailer hitch which can be locked in either a coupled or an uncoupled position, while still providing a free, uncoupled position for engagement and disengagement from hitch ball 86.

SECOND EMBODIMENT

Referring now to FIGS. 14-16, a second embodiment 10 of the tamper resistant trailer hitch of the present invention is shown and generally designated by the numeral 100. Second embodiment hitch 100 includes a housing or body 102 defining a downwardly opening ball receiving cavity 84 therein into which a hitch ball 106 may be inserted. Disposed within body 102 is a coupling mechanism 108 which may be used to couplingly engage second embodiment hitch 100 to ball 106 by actuation of a handle 110 which is pivotally mounted on a pin 112, all as is known in the art. A tab 114 extends upwardly from body 102 into or adjacent handle 110, and handle 110 may be locked against pivotation by inserting the shackle of a padlock through hole 116, as is also known in the art. Second embodiment hitch 100 may also use other coupling arrangements. One such device utilizes a rotating knob positioned above body 102, and the second embodiment is not intended to be limited to any particular coupling mechanism.

A pivot support plate 118 is disposed adjacent the lower side of body 102, and a pivot pin 120 extends downwardly therefrom. A locking plate 122 is pivotally mounted on the lower end of pivot pin 120 so that it may be pivoted in a generally horizontal plane immediately below body 102.

Referring now to FIG. 15, locking plate 122 is shown in a first, locked, coupled position with a second, unlocked, uncoupled position of the locking plate indicated in phantom lines. It will be seen that the second position is a variable free position allowing insertion of hitch ball 106 into cavity 104 and removal of the hitch ball from the cavity. Locking plate 122 has a substantially hook-shaped first end 124 defining a curvilinear, generally C-shaped notch 126 therein. Opposite first end 126 is a substantially solid second end 128. First end 124 defines a first hole 130 therethrough, and second end 128 defines a similar second hole 132 therethrough. As will be seen, holes 130 and 132 are equidistant from, and aligned with, pivot pin 120.

As shown in the coupled position of FIG. 15, holes 130 and 132 and pivot pin 120 are on a substantially longitudinal center line of second embodiment hitch 100. In this position, the edge of notch 126 is in close, spaced relationship to neck 134 of hitch ball 106. Preferably, in this first position, ball 106 may not be removed from body 112, regardless of the position of coupling mechanism 108. However, this interaction of locking plate 122 with hitch ball 106 is not intended to replace the actual coupling mechanism, but merely provide a backup for the coupling mechanism and to further increase the tamper resistance of hitch 100.

A front guard 136 extends downwardly from housing 12 and forms a lip portion extending below first end 124 of locking plate 122. A rear bottom guard plate 138 extends transversely across hitch 100 and below second end 128 of locking plate 122. Rear guard 138 defines a hole 140 therethrough which is aligned with hole 132 in first end 128 of locking plate 122 when the locking plate is in the coupled position shown in FIG. 15.

Body 112 defines a hole 142 therethrough which is coaxial with hole 140 and rear guard 138. The upper end of body 102 defines a larger hole 144 therethrough which is coaxial with hole 142. A cylinder lock 146 is disposed through hole 144 and mounted on a lock support 148 connected to body 102. A lock pin or member 150 extends downwardly from cylinder lock 146, and when in the locked position shown in FIGS. 14 and 15, lock pin 150 extends through holes 142, 132 and 140 so that locking plate 122 is locked against pivotation with respect to body 102. It will thus be see that even if handle 110 is unlocked so that coupling mechanism 108 may be disengaged, first end 124 of locking plate 122 will still prevent removal of hitch ball 106 from cavity 104.

To unlock and uncouple second embodiment hitch 100 from ball 106, the lock in hole 116 is removed so that handle 110 may be actuated to disengage coupling mechanism 108. A key is inserted into cylinder lock 146 so that lock pin 150 is moved upwardly and out of engagement with hole 132 in locking plate 122 and hole 140 in rear guard 138, as shown by dashed lines in FIG. 1. Locking plate 122 may then be pivoted to its variable second, free position shown by the phantom lines in FIG. 15 so that first end 124 thereof is no longer engaged with hitch ball 106. Second embodiment hitch 100 may then be removed from the hitch ball as desired.

Pivoting locking plate 122 through an angle of approximately 180° will place it in a third, lockable, uncoupled position, as shown in FIG. 16. In this third position, solid second end 128 of the locking plate completely covers the open, lower end of ball receiving cavity 104 so that access thereto is prevented. It will be seen that first end 124 is thus disposed between rear guard 138 and body 102 so that hole 130 in first end 124 is aligned with hole 140 in rear guard 138 and hole 142 in body 102. By actuating cylinder lock 146, lock pin 150 may thus be inserted through holes 142, 130 and 140 which again locks locking plate 122 against rotation with respect to body 102.

Thus, second embodiment hitch 100, as well as first embodiment hitch 10, may be locked in a coupled position or a tamper resistant uncoupled position, while still providing a free, uncoupled position for engagement with a trailer hitch ball.

THIRD EMBODIMENT

Figure 17:
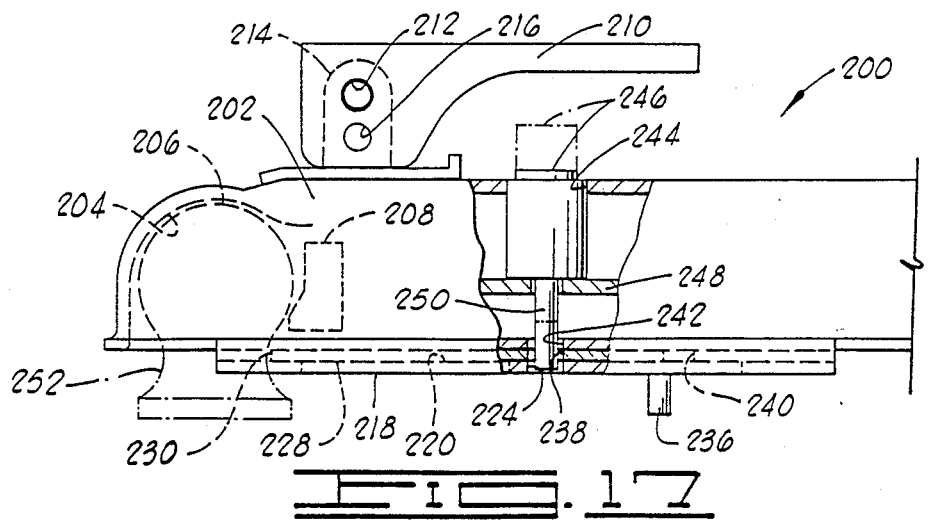
FIG. 17 illustrates a side elevation view of a third embodiment of the trailer hitch of the present invention shown in a locked, coupled position, including a fragmentary cross section showing certain details.
Figure 18:
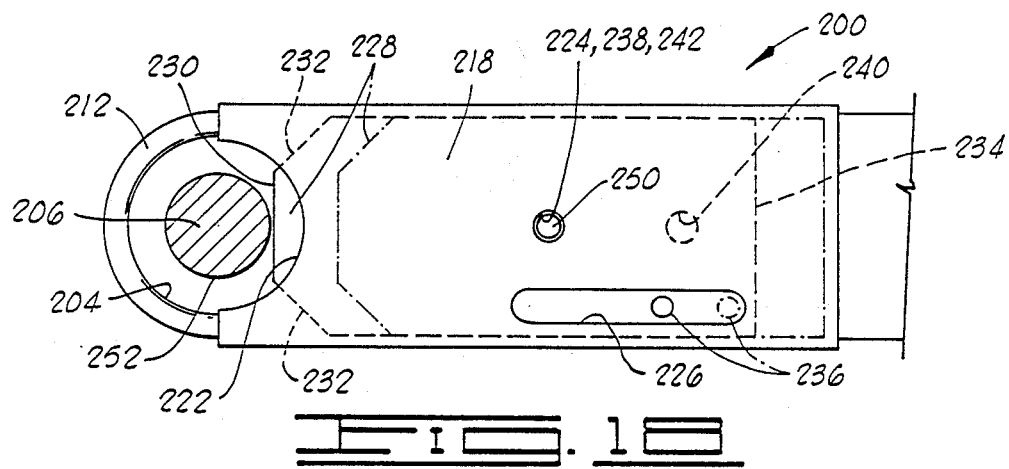
FIG. 18 shows the third embodiment trailer hitch in the locked, coupled position with an unlocked, free and uncoupled position shown in phantom lines.
Figure 19:
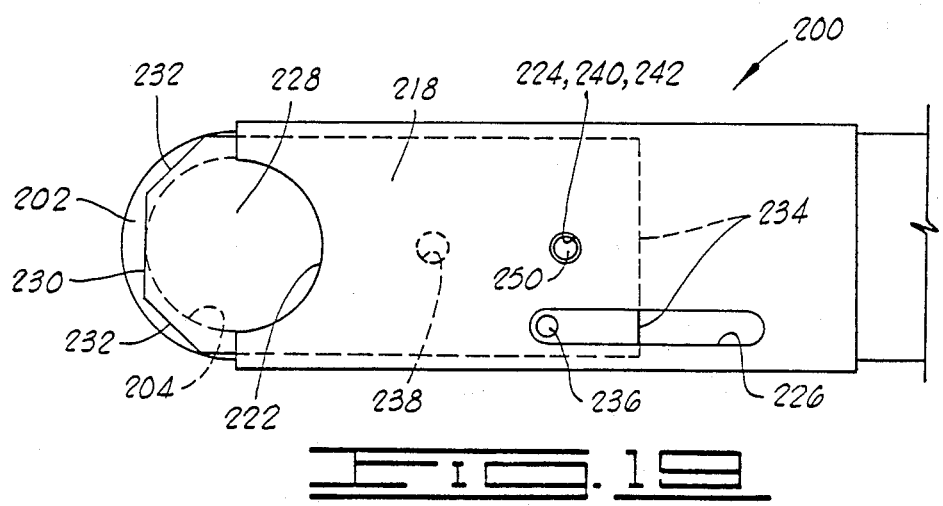
FIG. 19 is a bottom view of the third embodiment shown in a locked, uncoupled position in which the ball receiving cavity is covered.

Referring now to FIGS. 17-19, a third embodiment of the tamper resistant trailer hitch of the present invention is shown and generally designated by the numeral 200. Second embodiment hitch 200 has a body 202 defining a ball receiving cavity 204 therein into which may be inserted a hitch ball 206. Coupling mechanism 208 may be couplingly engaged with ball 206 by actuation of a handle 210 which pivots about a pin 212. Handle 210 may be locked in position against a tab 214 extending upwardly from body 202 by inserting a padlock through hole 216. These components of third embodiment trailer hitch 200 are substantially identical to the corresponding elements of second embodiment trailer hitch 100, and as with the second embodiment, third embodiment 200 is not intended to be limited to the particular coupling mechanism illustrated.

A bottom plate 218 is attached to the lower end of body 202 such that a generally horizontally oriented channel 220 is defined therebetween. At the forward end of bottom plate 218 is a forwardly opening notch 222 which generally conforms to cavity 204 and allows insertion of hitch ball 206 therein. Bottom plate 218 defines a hole 224 therethrough which is located in a generally central area of the bottom plate. Spaced to one side of hole 224, bottom plate 218 also defines a substantially longitudinally oriented slot 226 therein.

Slidably disposed in channel 220 between bottom plate 218 and body 202 is a horizontally oriented locking plate 228. Locking plate 228 has a forward edge 230 with chamfers 232 on opposite sides thereof and a rearward edge 234. An actuation pin or handle 236 is fixedly attached to locking plate 228 and extends downwardly therefrom through slot 226 in bottom plate 218. Locking plate 228 also defines first and second spaced holes 238 and 240, respectively, therethrough.

The lower end of body 202 defines a hole 242 therethrough which is aligned with hole 224 in bottom plate 218. The upper end of body 202 defines a larger hole 244 therethrough which is aligned with hole 242. A cylinder lock 246 is disposed through hole 244 and is mounted on a lock support 248 connected to body 202. Extending downwardly from cylinder lock 246 is a lock pin or member 250.

Referring now to FIG. 18, locking plate 228 is shown in a first, coupled position with a second, free and uncoupled position illustrated in phantom lines. When locking plate 228 is in the second position, it will be seen that hitch ball 206 may be inserted into or removed from cavity 204. When locking plate 228 is in the first coupled position thereof, forward edge 230 of the locking plate is adjacent neck 252 of hitch ball 206. It will be seen that in this position, locking plate 228 prevents removal of hitch ball 206 from cavity 204 regardless of the position of coupling mechanism 208. As with second embodiment hitch 100, locking plate 228 in third embodiment hitch 200 is not intended as a replacement for coupling mechanism 208, but instead acts as a backup to the coupling mechanism and to provide additional tamper resistance when hitch 200 is coupled to ball 206.

When in the coupled position shown in FIG. 18, first hole 238 of locking plate 228 is aligned with hole 224 in bottom plate 218 and hole 242 in body 202. Thus, cylinder lock 246 may be actuated so that lock pin 250 extends through holes 242, 238 and 224 to lock locking plate 228 in the coupled position. Thus, second embodiment hitch 200 is locked around hitch ball 206 so that the hitch may not be removed from the ball regardless of the position of handle 210 and coupling mechanism 208.

To uncouple second embodiment hitch 200 from ball 206, the padlock is removed from hole 216 and handle 210 actuated to disengaged coupling mechanism 208. Cylinder lock 246 is unlocked as shown by the dashed lines in FIG. 17, so that lock pin 250 is disengaged from hole 238 in locking plate 228 and hole 224 in bottom plate 218. It will be seen that locking plate 228 is thus free to slide longitudinally in channel 220, and the locking plate may be easily moved by the use of actuation pin 236. By moving actuation pin 236 to the rear of slot 226, it will be seen that forward edge 230 of locking plate 228 is moved away from neck 252 of hitch ball 206, as shown by the dashed lines in FIG. 18. In this uncoupled position, second embodiment hitch 200 may be removed from ball 206 as desired.

After hitch 200 is removed from ball 206, actuation pin 236 may be moved to the forward end of slot 226 as shown in FIG. 19. Locking plate 228 is correspondingly moved forward to a third position so that it completely covers cavity 204 in body 202 to prevent access to the cavity. In this covered, uncoupled position, second hole 240 in locking plate 218 is aligned with hole 224 in bottom plate 218 and hole 242 in body 202. Thus, re-locking cylinder lock 246 moves lock pin 250 through holes 242, 240 and 224 which locks locking plate 228 in the third, covered, tamper resistant position shown in FIG. 19.

As with first embodiment hitch 10 and second embodiment hitch 100, third embodiment hitch 200 thus provides a trailer hitch which may be locked in a coupled position or in a tamper resistant uncoupled position, while still providing a free, uncoupled position for engagement with hitch ball 206.

It can be seen therefore, that the tamper resistant trailer hitch of the present invention is well adapted to carry out the ends and advantages mentioned, as well as those inherent therein. While three presently preferred embodiments of the invention have been shown for the purposes of this disclosure, numerous changes in the arrangement and construction of parts in any of the embodiments may be made by those skilled in the art. All such changes are encompassed within the scope and spirit of the appended claims.

What is claimed is:

1. A trailer hitch for connection to a hitch ball, said trailer hitch comprising:
   a housing at least partially defining an open sided ball receiving cavity therein;
   coupling means on said housing for coupling engagement with said hitch ball when said hitch ball is positioned in said cavity, said coupling means being characterized by a gate member pivotally connected to said housing and forming a portion of said ball receiving cavity, said gate member having:
      an uncoupled position pivoted away from said housing wherein said hitch ball may be inserted into and removed from said cavity; and
      a coupled position pivoted toward said housing for couplingly engaging said hitch ball in said cavity and preventing removal of said hitch ball from said cavity; and
   closure means for preventing undesired removal of said hitch ball from said cavity and for covering the open side of said cavity when said hitch ball is removed form said cavity, said closure means comprising:
      a ring rotatably mounted with respect to a neck portion extending from said housing, said ring being rotatable between:
         a first position spread from said gate member;
         a second position engaging said gate member and retaining said gate member in said coupled position thereof; and
         a third position; and
      a cover extending from said ring, said cover being disposed across said open side of said cavity when said ring is in said third position.

2. The trailer hitch of claim 1 further comprising:
   a cam portion on one of said neck and said ring and defining a cam groove therein; and
   a cam follower on the other of said neck and said ring and engaging said cam groove, such that said ring is moved longitudinally away from said housing when rotated to said first position of said ring, and said ring is moved longitudinally toward said housing when rotated to said second and third positions of said ring.

3. The trailer hitch of claim 2 wherein said cam groove is substantially V-shaped.

4. The trailer hitch of claim 2 wherein:
   said first and second positions of said ring are angularly disposed approximately 90° from one another; and
   said first and third positions of said ring are angularly disposed at approximately 90° from one another.

5. The trailer hitch of claim 1 wherein:
   said neck portion defines a transverse hole therethrough having first and second ends; and
   further comprising a lock mounted on said ring, said lock having a lock member lockingly engageable with said first end of said hole when said ring is in said second position and lockingly engageable with said second end of said hole when said ring is in said third position.

6. The trailer hitch of claim 5 further comprising detent means in said hole for aligning said lock member with said hole.

7. The trailer hitch of claim 6 wherein said detent means comprises:
   a detent recess defined in an inner surface of said ring and opposite said lock member;
   a pair of detent pins slidably disposed in said hole, each of said detent pins being engageable with said detent recess when aligned therewith; and
   biasing means for radially outwardly biasing said detent pins toward said inner surface of said ring.

8. A trailer hitch comprising:
   a body defining a notch in a side thereof and further defining a portion of a ball receiving cavity therein;
   a gate member pivotally attached to said body for pivotation in said notch, said gate member defining another portion of said ball receiving cavity and having a rear portion;
   a neck extending rearwardly from said body, said neck having a substantially cylindrical outer surface; and
   a locking ring rotatably disposed around said neck, said locking ring having a cover portion extending forwardly therefrom and having a substantially cylindrical inner surface, said locking ring being rotatable between:

a first position spaced rearwardly from said body such that said gate member is free for outward pivotation to an open position for permitting insertion of a hitch ball into said cavity and removal of said hitch ball from said cavity;

a second position forward of said first position wherein said locking ring covers said rear portion of said gate member for preventing outward pivotation of said gate member with respect to said body such that removal of said hitch ball from said ball receiving cavity is prevented; and a third position forwardly of said first position wherein said locking ring covers said rear portion of said gate member for permitting outward pivotation of said gate member with respect to said body such that said cover member is positioned across an open side of said cavity for preventing access thereto.

9. The hitch of claim 8 wherein:

one of said neck and locking ring has a cam portion defining a substantially V-shaped cam groove thereon, said cam groove having first and second end portions and a central portion; and the other of said neck and locking ring has a cam pin extending therefrom into said cam groove, said pin being positioned in said central portion of said cam groove when said locking ring is in said first position, in said first end portion of said cam groove when said locking ring is in said second position, and in said second end portion of said cam groove when said locking ring is in said third position, whereby rotation of said locking ring about said neck longitudinally moves said locking ring with respect to said neck.

10. The trailer hitch of claim 8 wherein said neck and body are integrally formed.

11. The trailer hitch of claim 8 further comprising locking means for selectively locking said locking ring in said second and third positions.

12. The trailer hitch of claim 11 wherein:

said neck portion defines a transverse hole therethrough; and said locking means comprises a lock member lockingly engageable with said one end of said hole when said locking ring is in said second position and lockingly engageable with another end of said hole when said locking ring is in said third position.

13. The trailer hitch of claim 12 further comprising detent means in said hole in said neck portion for aligning said lock member with said hole.

14. The trailer hitch of claim 13 wherein said detent means comprises:

a detent recess defined in said inner surface of said locking ring and opposite said lock member;

a pair of detent pins slidably disposed in said hole, each of said detent pins being engageable with said detent recess when aligned therewith; and biasing means for radially outwardly biasing said detent pins toward said inner surface of said locking ring.

15. The trailer hitch of claim 8 wherein:

said rear portion of said gate member defines a groove therein with a lip adjacent said groove; and an inner surface of said locking ring defines a groove therein with another lip adjacent said groove in said inner surface; and further comprising biasing means for biasing said gate member toward an outward position with respect to said body, whereby said lip on said gate member engages said groove in said locking ring and said lip on said locking ring engages said groove in said gate member when said locking ring is rotated from said second toward said first position and from said third toward said first position for preventing undesired outward pivotation of said gate member.

* * * * *

UNITED STATES PATENT AND TRADEMARK OFFICE
CERTIFICATE OF CORRECTION

PATENT NO. : 4,925,205
DATED : May 15, 1990
INVENTOR(S) : S. Leonard Villalon, James D. Olds and William H. Shoffner It is certified that error appears in the above-identified patent and that said Letters Patent is hereby corrected as shown below:

Column 7, line 9, after "recess" and before "in", insert --84--.

Column 9, line 32, delete "see" and insert --seen-- therefor.

Column 12, line 6, delete "spread" and insert --spaced-- therefor.

Signed and Sealed this

Second Day of July, 1991

Attest:

HARRY F. MANBECK, JR.

Attesting Officer

Commissioner of Patents and Trademarks